May 22, 1934.   H. T. JONES   1,959,919
DRILLING TOOL
Filed April 19, 1933
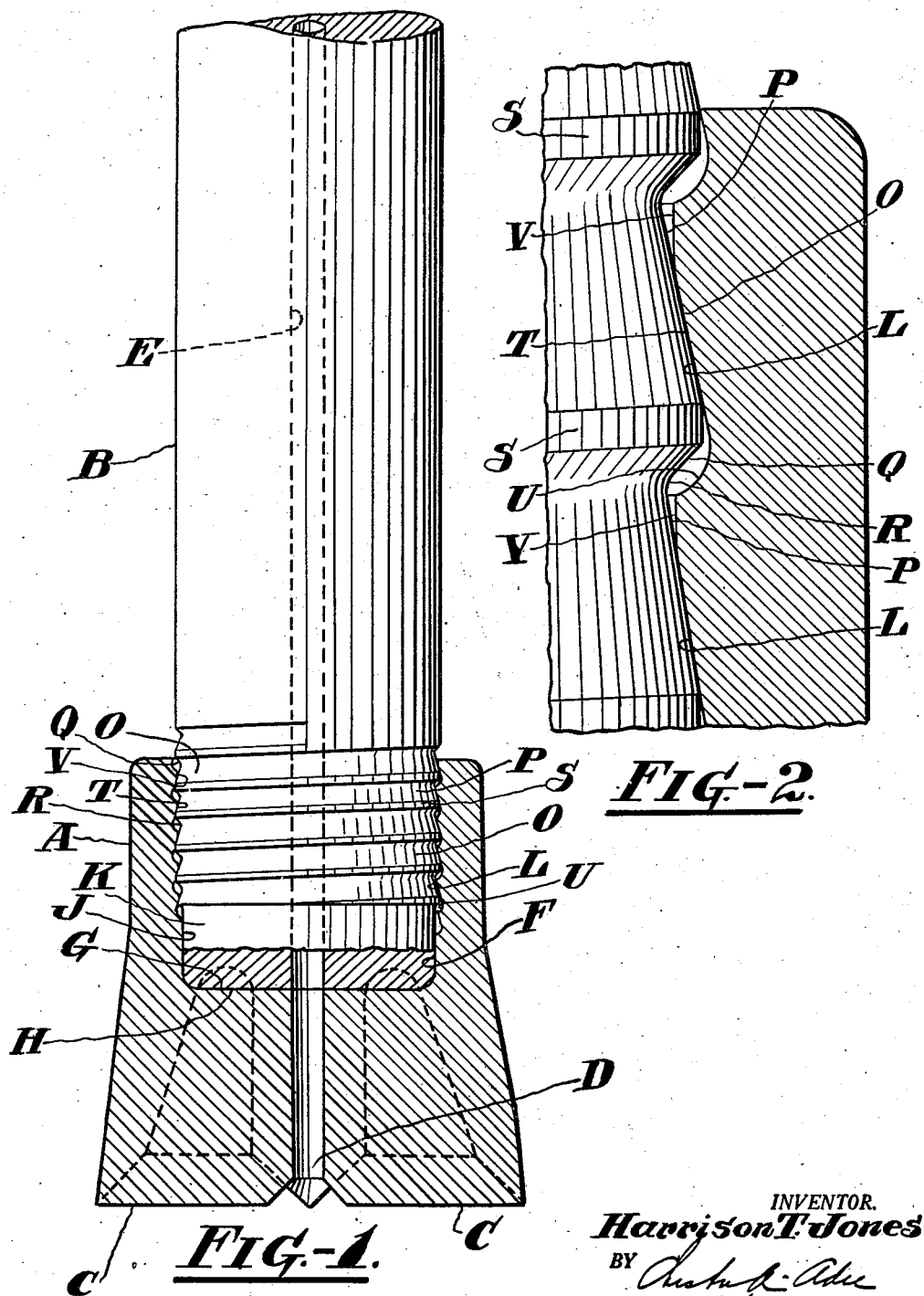
INVENTOR.
Harrison T. Jones
BY
HIS ATTORNEY.

Patented May 22, 1934

1,959,919

UNITED STATES PATENT OFFICE 1,959,919

DRILLING TOOL

Harrison T. Jones, Easton, Pa., assignor to Ingersoll-Rand Company, Jersey City, N. J., a corporation of New Jersey Application April 19, 1933, Serial No. 666,782

3 Claims. (Cl. 255—64)

This invention relates to drilling tools, and more particularly to tools of this character wherein the cutting bit is formed as a separate member and attachable to the shank whereby the blows of the percussive element are transmitted to the cutting bit.

One object of the invention is to enable the cutting bit to be conveniently attached to or detached from the shank.

Another object is to avoid subjecting the bit and shank securing means to the blows or shocks employed for driving the cutting bit.

Still another object is to provide an ample path for and assure a correct distribution of the force applied to the shank for driving the cutting bit into the work.

Other objects will be in part obvious and in part pointed out hereinafter.

In the drawing accompanying this specification and forming a part thereof and in which similar reference characters refer to similar parts, Figure 1 is an elevation partly in section of a drilling tool constructed in accordance with the practice of the invention, and Figure 2 is an elevation partly in section showing, in a detailed manner, the relationship of the several threaded faces when the bit and shank are secured together.

Referring more particularly to the drawing, A designates the drill bit and B the shank through which the blows of a percussive element, such as a rock drill of the hammer type (not shown), are transmitted to the cutting bit.

The cutting bit A may, insofar as its cutting edges C and their arrangement on the front end of the bit are concerned, be of a well known type arranged in cruciform fashion, and at the juncture of the cutting edges C is a passage D which extends axially through the cutting bit and registers with a similar passage E in the shank B for conveying cleansing fluid into the hole being drilled to remove the detritus therefrom.

In the opposite end of the bit A is a generally cylindrical recess F of which the bottom constitutes a seating surface G for a seating surface H on a generally cylindrical end of the shank B extending into the recess F. The portion J of the recess F adjacent the seating surface H is of cylindrical shape to slidably engage a corresponding cylindrical portion or extension K on the front end of the shank B.

The cylindrical portion J is of less length than the cylindrical extension K, and from the rear extremity of the cylindrical portion J to the outer end of the recess F extends a spiral groove or thread L to engage a spiral thread O on the shank B and being located intermediate the extension K and the main body portion of the shank.

Although adapted for interengagement, the threads L and O differ somewhat in minor respects and, for that reason, will be described separately. Both sides of the thread O are arranged angularly with respect to each other but incline in different degrees toward the axis of the shank B. The rearward side of the thread O which, in the present instance, constitutes a spiral cam surface P is of considerable width as compared with that of the forward side Q of the thread and inclines toward the axis of the shank, as the shank is viewed from its front end, only in sufficient degree to maintain the shank in engagement with the bit A.

The angle of inclination of the surface P found to be practical for this purpose is approximately twelve degrees. However, this angle may vary and may be of any degree suited to assure retention of the bit on the shank without causing undue binding of one member on the other.

The front side Q of the thread O may be of any suitable degree of inclination as, for instance, forty-five degrees from the axis of the shank and is preferably joined to the adjacent portion of the cam surface P by a radius R to avoid the formation of sharp corners on the shank. The crest of the thread O may be flatted, as indicated at S, to reduce the area of contact between the cam surface P and that portion of the thread L which constitutes a cam surface T and against which the cam surface P seats in the assembled positions of the shank and the bit.

The thread L differs from the thread O principally in that its front end is curved or radiused as at U to provide clearance between the front end of the thread L and the side Q of the thread O. Preferably the rearward portion of the cam surface T is relieved as at V to prevent contact between the thread L and the radiused portion R of the thread O.

In practice, the present invention has been found to serve as an exceedingly convenient means for attaching a drill bit to or detaching it from the shank. Owing to the arrangement of the threads or cam surfaces the bit may be readily threaded upon the shank without interference by friction until the seating surfaces H and G contact. When these surfaces are brought together rotative force thereafter applied to the bit or the shank will force the surfaces P and T into intimate frictional engagement, thus altogether preventing the entrance of cuttings between the essential areas of contact. It naturally follows, therefore, that the parts may again be separated without damage and with a minimum of force.

As will be observed, in the assembled position of the parts the forward side Q of the thread O does not contact with any portion of the thread L so that the threads will be protected against the effects of the shock delivered to the drilling tool for driving it into the rock. Inasmuch as the front end of the shank B seats directly upon the seating surface H in the bit the blow is transmitted through a wide path so that its force will be equably distributed to the cutting edges of the bit.

I claim:

1. A drilling tool comprising shank and bit members having cylindrical inter-engaging threaded portions, seating surfaces on the members, the threads on the members having their opposite sides inclined in different degrees toward the axes of the members to provide spiral cam surfaces on those sides of the threads having the lesser degree of inclination to hold the seating surfaces firmly together, said spiral surfaces providing the only areas of contact between the threads.

2. A drilling tool comprising shank and bit members having inter-engaging threads of which the several sides incline toward the axes of the members in different degrees, and seating surfaces on the members abutting each other to force the sides of lesser inclination into frictional contact for holding the members together and to prevent contact between the sides of greater inclination, thereby avoiding the transmission of shock through the threads.

3. A drilling tool comprising a cutting bit having a recess, threads in the recess and of which the sides incline toward the axes of the bit in different degrees of inclination, a seating surface in the bottom of the recess, a shank having threads conforming to the shape of and engaging the threads in the recess, and a seating surface on the end of the shank abutting the seating surface in the recess to press the sides of lesser inclination into frictional contact for securing the members together and to prevent contact between the sides of greater inclination, thereby avoiding the transmission of shock through the threads.

HARRISON T. JONES.